United States Patent [19]
Pecorari

[11] Patent Number: 5,957,000
[45] Date of Patent: Sep. 28, 1999

[54] LUBRICATED WORM GEAR DRIVEN SLEWING BEARING

[76] Inventor: Paul A. Pecorari, 1007 Davids Dr., Aston, Pa. 19014

[21] Appl. No.: 09/002,693

[22] Filed: Jan. 5, 1998

[51] Int. Cl.⁶ .................................................. F16H 1/16
[52] U.S. Cl. ............................................................ 74/425
[58] Field of Search .................................. 74/425, 89.14; 384/114, 152, 462, 489, 44; 277/351, 591, 599

[56] References Cited

U.S. PATENT DOCUMENTS 2,038,731  4/1936  Gunderson ................................. 74/425
4,639,149  1/1987  Bras et al. ................................ 277/351

Primary Examiner—Tamara L. Graysay
Assistant Examiner—Colby Marshall Hansen
Attorney, Agent, or Firm—Charles S. Knothe, Esq.

[57] ABSTRACT

A worm gear driven slewing bearing for use with boom lifts, utility cranes, light turning devices and medium duty cranes wherein the worm gear and the teeth of the bearing are totally enclosed from the outside elements and a cavity formed by the housing is filled with lubricant to lubricate the worm and gear teeth.

1 Claim, 4 Drawing Sheets

LUBRICATED WORM GEAR DRIVEN SLEWING BEARING

BACKGROUND OF INVENTION

A large number of boom lifts, utility cranes, light turning devices and medium duty cranes are used for construction and maintenance tasks. Most of these devices consist of a wheeled vehicle or platform upon which a rotatable body is mounted. In most of these devices the rotation is performed by a worm gear driven slewing bearing.

In all the current worm gear driven slewing bearings the worm gear is mounted on an open housing and then mounted to a slewing bearing with several fasteners to allow the adjustment of the backlash. Both the worm gear and the gear teeth of the bearing are exposed and visible. They are lubricated with grease but the grease does not remain between them because of the friction between them. Consequently the worm gear and the gear teeth of the bearing quickly run dry. Further, these boom lifts are used under adverse conditions and because these parts are exposed to the elements such as water, dust and dirt the wear is increased tremendously.

Because of the lack of grease when rotating the unit, a condition know as slip stick occurs. The amount of torque necessary to turn the unit increases tremendously and the rotational speed is decreased and then suddenly the friction is overcome and less torque is necessary and the rotational speed is increased. This causes difficulty for the operator of the boom in positioning it.

In this invention the worm gear and the teeth of the bearing are totally enclosed from the outside elements so no dirt, dust, water or particles can get between them. Further, they are continuously and completely lubricated by an oil bath. Thus the need to grease is eliminated and the occurrence of slip stick is eliminated because the worm and gear constantly have an oil film between them. This reduces the wear and resultant backlash between the worm and the gear. A little backlash is multiplied many times over at the end of the boom making the operation of the boom difficult.

SUMMARY OF INVENTION

This invention pertains to a worm gear driven slewing bearing. It has a housing of a generally circular bowl shape with a base and curved walls perpendicular to the base and an aperture centered in the base. An o-ring groove is in the housing concentric with the aperture within the base and a filler plug fits in an opening in the wall of the base. An o-ring sits in the annular groove in the housing.

An inner ring with an outer and inner surface and two sides is attached to the housing along one of its sides by means of fasteners. An inner bearing race is created by an annular groove in the outer surface of the inner ring. An inner ring wiper seal ridge is cut in the outer surface of the inner ring and the side of the inner ring opposite to the side which connects to the housing. The inner wiper seal is press fitted to the inner ring wiper seal ridge. A plurality of balls ride in the inner bearing race.

The outer ring has an outer and inner surface and two sides and a plurality of gear teeth around a portion of the entire perimeter of the outer surface. The outer ring also has an outer wiper seal mating surface on the outer surface adjacent to the plurality of gear teeth. An outer ring bearing race is formed by an annular groove in the inner surface of the outer ring which contains the plurality of balls which ride in the inner bearing race. A plurality of threaded holes exist in a circular pattern on the side of the outer ring opposite the housing. The outer wiper seal presses into the housing and mates with the outer wiper seal mating surface.

A worm housing is formed into the housing and a plurality of bearing journals are contained in the worm housing. A worm on a shaft rotates within the bearing journals and mates to the gear teeth in the outer ring. A plurality of worm shaft seals coordinate with the worm shaft.

The cavity formed by the housing is filled with lubricant to lubricate the worm and gear teeth.

DETAILED DESCRIPTION OF THE DRAWINGS

Figure 1:
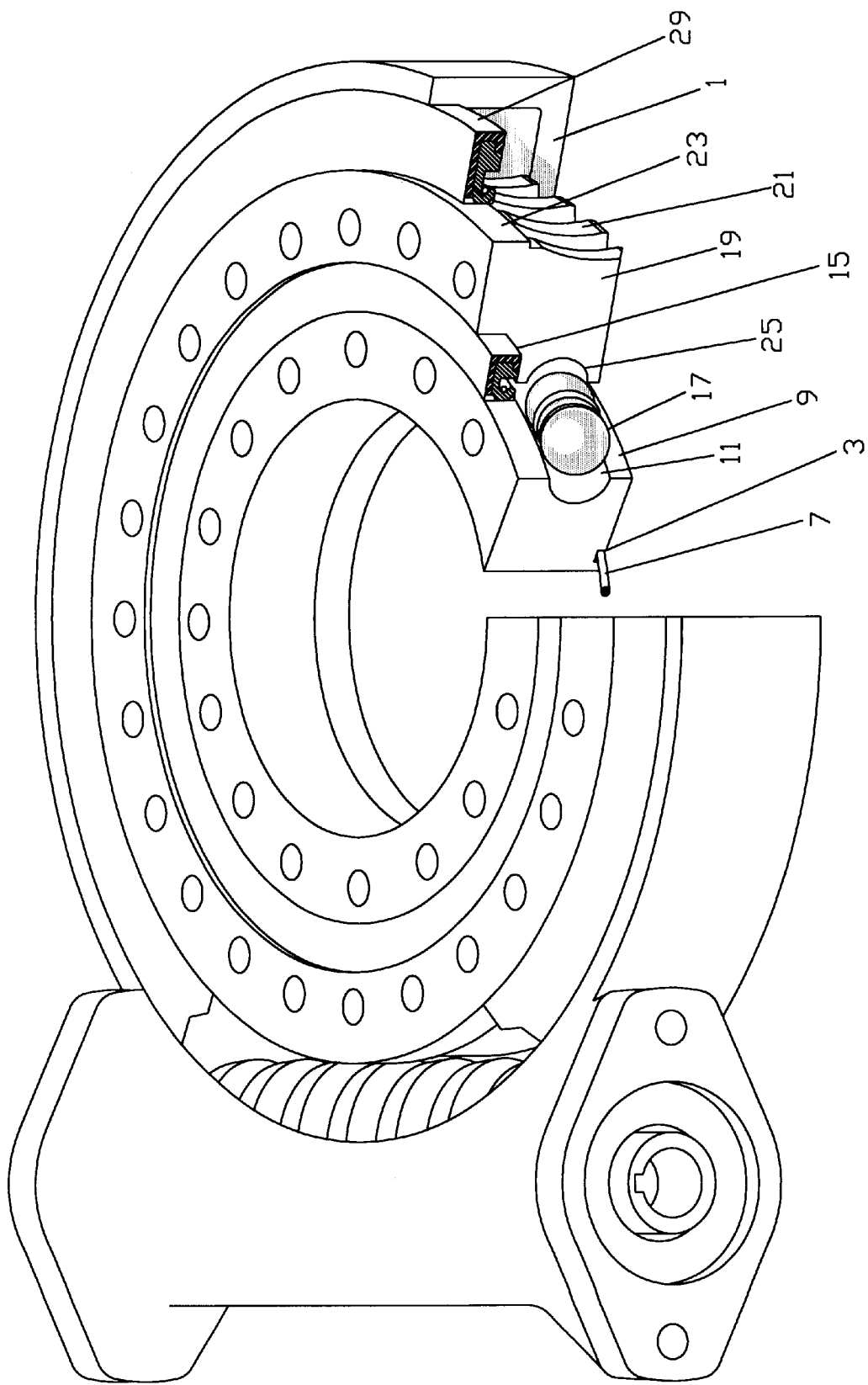
FIG. 1 is a cutaway perspective drawing of the device.

FIG. 1 is a sectional perspective view of the worm gear driven slewing bearing. This figure shows the wall of the housing around the bearing which is used to contain the lubricant. The inner ring 9 is attached to the housing 1 by a series of fasteners. An o-ring 7 is inserted in the o-ring groove 3 between the housing 1 and the inner ring 9, thus stopping the lubricant from escaping between these two surfaces. The inner ring 9 contains a bearing race 11 and the outer ring 19 contains a bearing race 25 which contains the balls 17. As known in the industry the balls are inserted through an access hole which is capped after assembly. Thus the outer ring 19 can rotate around the inner ring 9. FIG. 1 shows the gear teeth 21 in the outer side of the outer ring 19. These gear teeth are driven by the worm 35 in the worm housing 31 thus rotating the outer ring 19. The lubricant in the housing coats both the gear teeth 21 and the worm 35.

The outer wiper seal 29 contacts the outer wiper seal mating surface 23 which is formed from a portion of the outer side of the outer ring which is not cut with the gear teeth 21.

The inner wiper seal 15 and the outer wiper seal 29 stop water and dirt from contaminating the lubricant. In the preferred embodiment the bearing is positioned such that these seals are located on the top side. The seals act as merely dust shields. In the event the bearing is mounted in an inverted position such that these seals are on the bottom side, the seal quality must be such that they do not allow the lubricant to leak.

Figure 2:
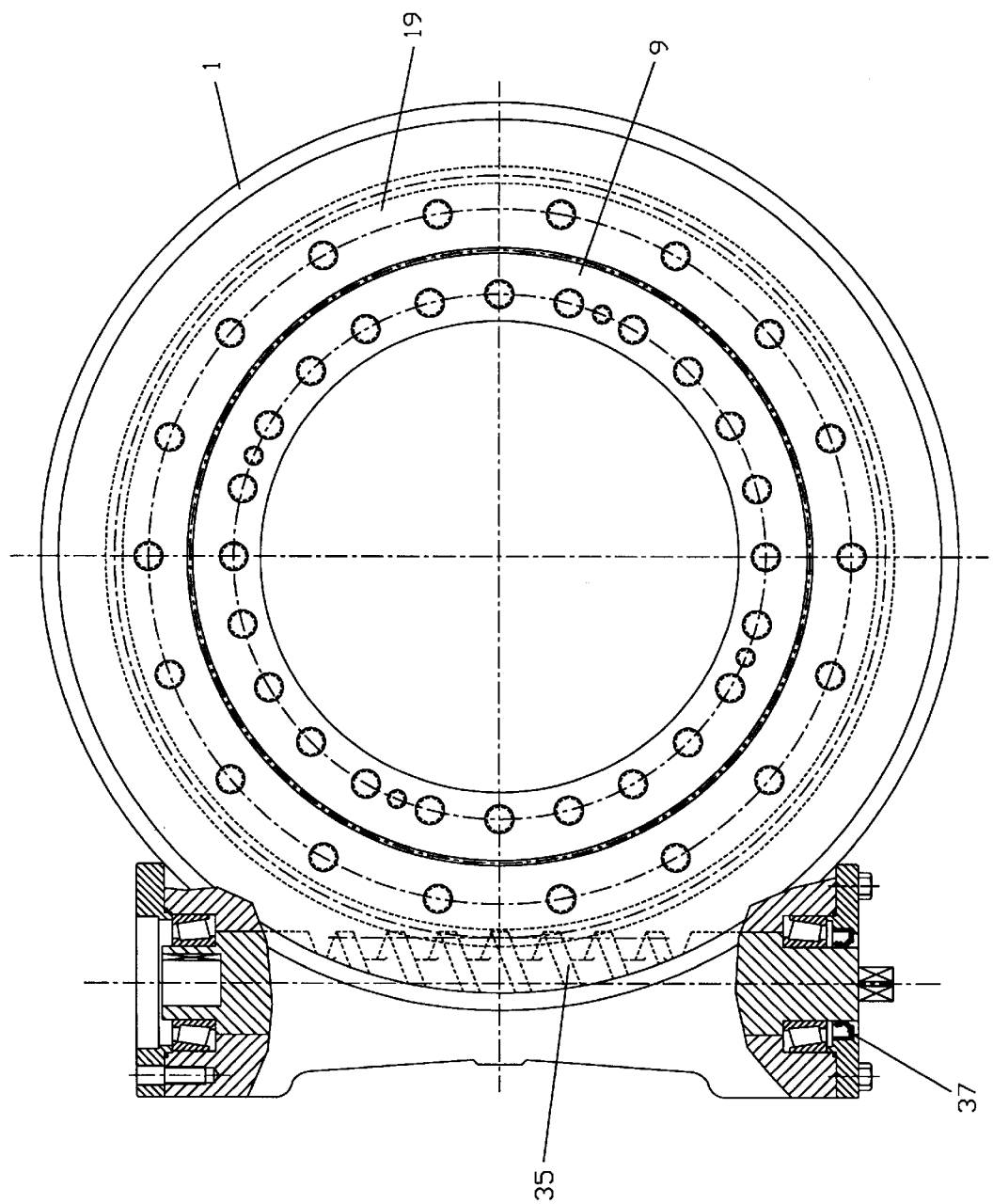
FIG. 2 is a top view of the device.

FIG. 2 shows the worm gear driven slewing bearing from the top view. The outer ring 19 is shown between the inner ring 9 and the housing 1 with the inner wiper seal 15 on one side and the outer wipe seal 29 on the other side. The inner ring 9 is stationary and the outer ring 19 rotates. FIG. 2 also shows the worm 35 which, when it turns, rotates the outer ring 19. The worm shaft seals 37 are also shown in this figure.

Figure 3:
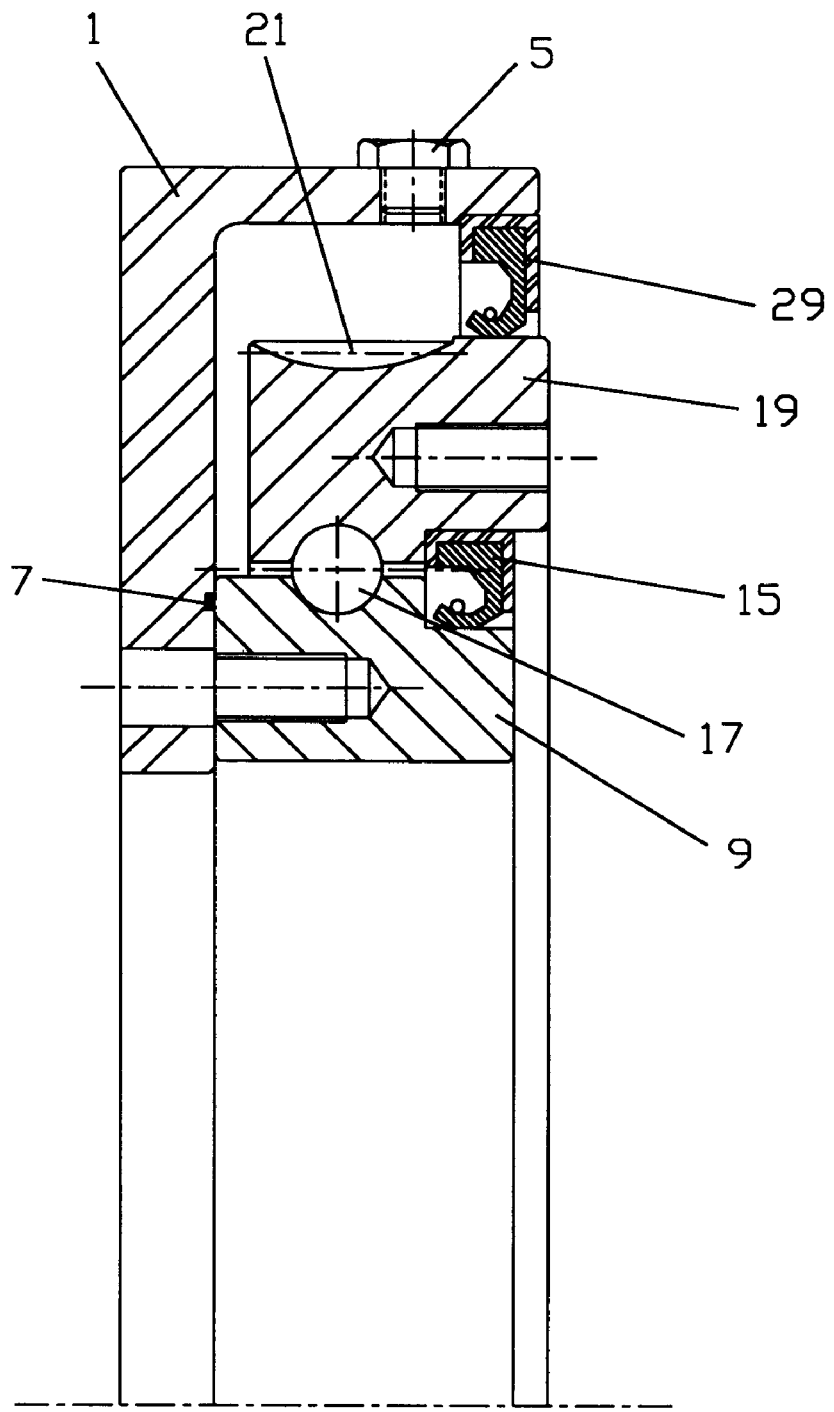
FIG. 3 is sectional view through the center of the device.

FIG. 3 is a sectional view through the center of the device along a radial line through the center of the bearing. This view shows the cavity which is created by the housing 1 and the inner ring 9 in which the outer ring 19 with its gear teeth 21 rotates. The cavity is filled with a liquid lubricant which keeps the worm and gears lubricated thus reducing the wear and the slip stick condition. Also, the ball 17 is lubricated within the bear race formed in the inner ring 9 and the outer ring 19. This figure also shows the location of the inner wiper seal 15 and the outer wiper seal 29.

Figure 4:
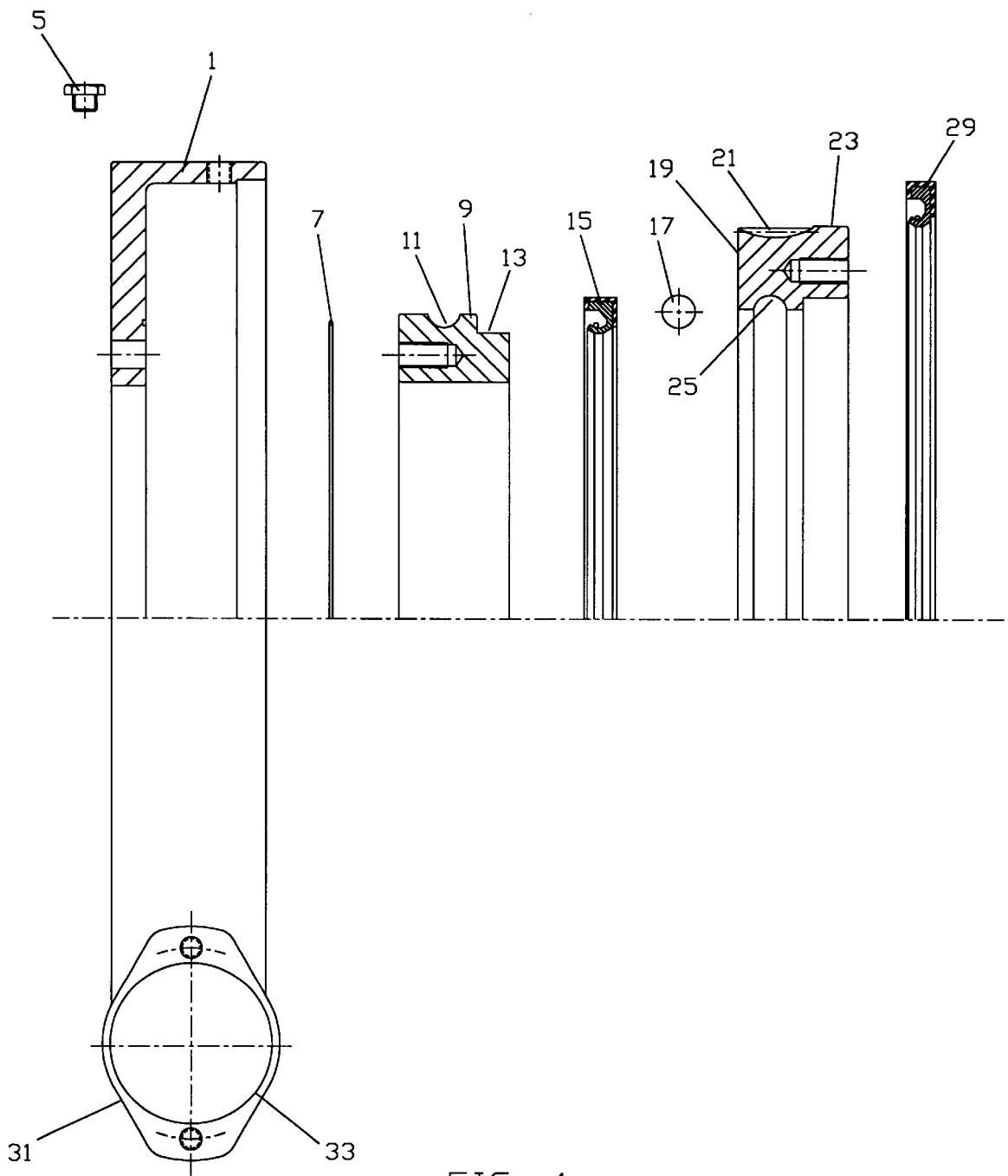
FIG. 4 is assembly cross section view of the device.

FIG. 4 is an exploded assembly cross sectional view of the device. This figure depicts the outer surface of the outer ring 19 containing the gear teeth 21 and the outer wiper seal mating surface 23 which is contacted by the seal 29. The ball 17 is contained in a race formed by the outer ring bearing race 25 and the inner bearing race 11. The inner wiper seal 15 is located in the inner ring wiper seal ridge 13 and contacts the inner surface of the outer ring 19. The o-ring 7 creates a seal between the inner ring 9 and the base 1 and fits in the o-ring groove 3. Also, this shows the filler plug 5. Attached to the housing 1 is the worm housing 31 which contains the worm bearing journals 33.

What is claimed is:

1. I claim a worm gear driven slewing bearing comprising:
- a housing having a cavity, said house of a generally circular bowl shape with a base and curved walls perpendicular to the base and an aperture centered in the base;
- an o-ring groove in the housing concentric with the aperture within the base;
- a filler plug which fits in an opening in the wall of the base;
- an o-ring which sits in the o-ring groove in the housing;
- an inner ring, with an outer and inner surface and two sides, which is attached to the housing along one of its sides by means of fasteners;
- an inner bearing race created by an annular groove in the outer surface of the inner ring;
- an inner ring wiper seal ridge cut in the outer surface of the inner ring and the side of the inner ring opposite to the side which connects to the housing;
- an inner wiper seal which is pressed into the inner ring wiper seal ridge;
- a plurality of balls which ride in the inner bearing race;
- an outer ring with an outer and inner an surface and two sides;
- a plurality of gear teeth around a portion of the entire perimeter of the outer surface of the outer ring;
- an outer wiper seal mating surface on the outer surface of the outer ring adjacent to the plurality of gear teeth;
- an outer ring bearing race formed by an annular groove in the inner surface of the outer ring which contains the plurality of balls which ride in the inner bearing race;
- a plurality of threaded holes in a circular pattern on the side of the outer ring opposite the housing;
- an outer wiper seal which is pressed into the housing and mates with the outer wiper seal mating surface;
- a worm housing which is formed into the housing;
- a plurality of bearing journals within the worm housing;
- a worm on a two ended shaft which rotates within the bearing journals and the worm mates to the gear teeth in the outer ring;
- a plurality of worm shaft seals which coordinate with the worm shaft;
- the cavity formed within the housing is filled with liquid lubricant.

* * * * *